United States Patent
Farhang-Boroujeny et al.

(12) 
(10) Patent No.: US 6,438,161 B1
(45) Date of Patent: Aug. 20, 2002

(54) METHOD OF DESIGNING AN EQUALIZER

(75) Inventors: Behrouz Farhang-Boroujeny; Baoli Wang; Mrityunjoy Chakraborty, all of Singapore (SG)

(73) Assignee: National Univ. of Singapore (SG)

( * ) Notice: Subject to any disclaimer, the term of this patent is extended or adjusted under 35 U.S.C. 154(b) by 0 days.

(21) Appl. No.: 09/406,930

(22) Filed: Sep. 28, 1999

(51) Int. Cl.$^7$ .......................... H04L 25/03; H04L 27/01
(52) U.S. Cl. ...................... 375/229; 375/232; 375/346
(58) Field of Search .......................... 375/219, 229, 375/230, 231, 232, 346, 348; 370/210; 708/400, 402, 403, 404, 405

(56) References Cited

U.S. PATENT DOCUMENTS

| | | | |
|---|---|---|---|
| 5,285,474 A | | 2/1994 | Chow et al. |
| 5,461,640 A | * | 10/1995 | Gatherer ...................... 375/231 |
| 5,479,447 A | * | 12/1995 | Chow et al. ................. 375/260 |
| 5,513,215 A | | 4/1996 | Marchetto et al. |
| 5,543,978 A | | 8/1996 | Park |
| 5,870,432 A | * | 2/1999 | Kerckhove .................. 375/232 |
| 6,081,502 A | * | 6/2000 | Paneth et al. ............... 370/210 |
| 6,185,251 B1 | * | 2/2001 | Fertner ........................ 375/231 |

FOREIGN PATENT DOCUMENTS

| | | |
|---|---|---|
| EP | 0 631 414 A1 | 12/1994 |
| EP | 0 768 778 A1 | 4/1997 |
| EP | 0 800 288 A2 | 10/1997 |
| WO | WO 98/39871 | 9/1998 |

OTHER PUBLICATIONS

Falconer et al, Adaptive Channel Memory Truncation for Maximum Likelihood Sequence Estimation, Bell Sys Tech Jnl, vol. 52, No. 9, Nov. 1973, pp. 1541–1562.
Farhang Boroujeny, Channel Equalization via Channel Identification:Algorithms and Stimulation Results for Rapidly Fading HF Channels, IEEE Trans/Comm. V44, #11, Nov. 1996, pp. 1409–1412.
Nafie, et al, Time–Domain Equalizer Training for ADSL, Proc. of ICC'97, circa Jan. 1997, 5 pages.
Search Report; Austrian Patent Office via Singapore Patent Office, Jun. 12, 2000.

\* cited by examiner

*Primary Examiner*—Young T. Tse
(74) *Attorney, Agent, or Firm*—ipsolon LLP

(57) ABSTRACT

A method of designing an equalizer having a target response suited to a particular subclass of communication channels to shorten the duration of the impulse response of the overall transmission system, a class of channels being divided into a number of subclasses, each subclass having a fixed set of parameters selected to achieve the target response of the equalizer for that particular subclass of channel, the method comprising the steps of recognizing the subclass of the channel; and identifying the fixed set of parameters for the equaliser to achieve the target response by reference to a look-up table based on the subclass of the channel.

10 Claims, 2 Drawing Sheets

METHOD OF DESIGNING AN EQUALIZER

TECHNICAL FIELD

This invention relates to a method of designing an equaliser, and more particularly to systems for transmission and reception of signals over channels which require equalisers for shortening the duration of the impulse response of the overall system. The invention is particularly related to multicarrier data transmission over severely distorting channels. Throughout this specification, the British-variant spelling of the term "equaliser" is used in lieu of the term equalizer, although the two terms mean the same thing.

BACKGROUND ART

FIG. 1 of the accompanying drawings depicts a basic diagram of a discrete multitone (DMT) data transmission system. A block of serial input data (information bits) is collected in a serial-to-parallel (S/P) converter and then passed through an encoder which groups them into a number of sub-blocks and subsequently maps the bits belonging to each sub-block to real and imaginary parts of a complex number. The complex numbers generated in this way are considered as DFT (direct Fourier transform) values of a time domain signal. An inverse DFT transformer (usually implemented using an inverse fast Fourier transform (IFFT) algorithm) is then used to convert the mentioned frequency domain complex-valued numbers to the time-domain. These time-domain numbers are treated as a sequence of amplitude modulated pulses which after band-limiting are transmitted over the channel. Up-conversion to a higher frequency band may be also necessary, depending on the communication channel.

In the receiver, the received signal is frame synchronised and sampled at proper time instants. A block of samples are collected and passed through a DFT transformer (usually implemented using a fast Fourier transform (FFT) algorithm) to recover back the original frequency domain complex-valued numbers which were generated at the encoder output in the transmitter. The decoding process in the receiver follows the reverse of the encoder at the transmitter, thus the original information bits are recovered.

The IFFT and FFT blocks in the DMT transmission system, in fact, are modulator and demodulator blocks, respectively, operating on all subcarriers in parallel. More detailed discussions on the concepts related to DMT transmission systems could be found in the literature (see E. A. Lee and D. G. Messerschmitt, *Digital Communication*. Kluwer Academic Publishers, 1994, and J. G. Proakis, *Digital Communications*. McGraw-Hill, 3rd Ed., 1995, for example).

The block diagram of FIG. 1 of the accompanying drawings ignores possible distortion that may be introduced by the channel. In DMT transmission systems, channel distortion is taken care of in a very special way, known as cyclic prefix. FIG. 2 of the accompanying drawings shows a block-diagram representation of this process. It can be shown that if the duration of the impulse response of the channel is less than or equal to L data samples, by appending the last L samples of each data block at the output of the IFFT unit in the transmitter to the beginning of that data block, sending this extended block over the channel and subsequently, at the receiver, using the last N samples of the extended block as input to the FFT unit, the resulting set of frequency domain samples at the FFT output will be similar to the complex-valued numbers at the input to the IFFT unit in the transmitter within some complex-valued constant coefficients. The process involving the extraction of the latter coefficients is known as frequency-domain equalisation. This type of equalisation is not the subject of the present invention. In this invention, we are concerned with another aspect of the DMT signals equalisation which is widely known as time-domain equalisation. This is explained next.

We note that the use of L prefix samples in each block of transmitted signal with N samples per block, in its original form, effectively reduces the data rate of the system by a factor N/(N+L). It is thus very important to keep L as small as possible. Since in most of the practical applications, one has very little or no control over existing channels, a feasible solution to reduce L is to add an equaliser at the receiver and choose the parameters of this equaliser such that the cascade of the channel and equaliser results in a shortened impulse response. This is known as impulse response truncation or shortening.

Falconer and Magee have given a solution to the problem of equaliser design for impulse response shortening in the context of single carrier data transmission systems. Their solution involves the following steps:

1. An L-by-L matrix, Q, which is given in terms of the channel impulse response and the autocorrelation coefficients of channel noise, is evaluated;
2. the eigenvector, q, of the matrix Q which corresponds to its minimum eigenvalue is obtained; and
3. the elements of the vector q are considered as the samples of the desired response at the equaliser output and the equaliser coefficients are obtained accordingly.

For more details on this procedure the reader should refer to D. D. Falconer and F. R. Magee, Jr., "Adaptive channel memory truncation for maximum likelihood sequence estimation", Bell Syst. Tech. J., vol. 52, No. 9, pp. 1541–1562, November 1973.

The above procedure is rather involved because of involvement of an eigenproblem. Thus, search for finding other alternative solutions which can be used to obtain the equaliser coefficients by a less involved procedure is of great practical interest.

Jacky Chow and John M. Cioffi have proposed such a method (U.S. Pat. No. 5,285,474, Feb. 8, 1994). This method involves a process of pole-zero modelling through a sequence of operations consisting of FFT, IFFT and some other intermediate operations. These operations, although relatively simple and regular, do not guarantee convergence of the equaliser coefficients to their optimum values, although a somewhat suboptimal solution may be achieved, if the system parameters are properly initialised. Nafie and Gatherer of Texas Instruments in a paper presented in ICC'97 (see list of references), have given an example of subscriber lines and shown that the results obtained by the method of Chow and Cioffi can be very far from the optimal solution that could be obtained from Falconer and Magee solution. They have also proposed a new scheme which works better than the method of Chow and Cioffi. However, their scheme also results in a solution which remains relatively far from the optimum, although it gives results somewhat better than those obtained by Chow and Cioffi's method. Only for relatively low signal-to-noise ratio (SNR) cases, the solutions provided by the method of Chow and Cioffi and also that of Nafie and Gatherer appear to be acceptable, however for moderate and high SNR's they fail to give acceptable results.

SUMMARY OF THE INVENTION

It is an object of the present invention to provide a completely different approach for designing impulse shortening equalisers. We have in particular examined our method on Asymmetric Digital Subscriber Line (ADSL) channels and have found that to be very useful and practical in this context. Nevertheless, the use of the methodology reported in this patent to other communication channels, wherever applicable, may be readily implemented by a person skilled in the art.

Accordingly, one aspect of the present invention provides a method of designing an equaliser having a target response suited to a particular subclass of communication channels to shorten the duration of the impulse response of the overall transmission system, a class of channels being divided into a number of subclasses, each subclass having a fixed set of parameters selected to achieve the target response of the equaliser for that particular subclass of channel, the method comprising the steps of:

recognizing the subclass of the channel;
and identifying the fixed set of parameters for the equaliser to achieve the target response by reference to a look-up table based on the subclass of the channel.

Preferably, the further step of estimating the impulse response of the channel is performed, to identify which subclass of channel the estimated channel belongs to.

Conveniently, the method of recognizing the subclass comprises the step of carrying out a signature analysis of the channel impulse response.

Advantageously, the subclasses are categorised into a number of subclasses for each of which a fixed set of parameters can be applied to an equaliser to cause very little degradation in the signal to noise ratio at the equaliser output.

Preferably, the fixed set of parameters for the equaliser comprises a delay parameter and a desired response.

Conveniently, the equaliser has equaliser coefficients, the optimum values of which are obtained by generating and solving a Wiener-Hopf equation using the fixed set of parameters for the equaliser obtained from the look up table.

Advantageously, the equaliser has equaliser coefficients, the optimum values of which are obtained by computation using a frequency domain approach.

Preferably, the frequency domain approach computation comprises the formula $$W(k) = \frac{H^*(k)D(k)e^{-j2\pi\Delta k/K}}{|H(k)|^2 + N(k)}, \text{ for } k = 0, 1, \ldots, K-1 \quad (1)$$

where H(k) and D(k) are discrete Fourier transforms of h(n) and d(n), respectively, K is the length of DFT, N(k)'s are samples of power spectral density of the combined channel noise and crosstalks, and W(k) is the DFT of the equaliser response, w(n).

Conveniently, the look-up table comprises two look-up tables: a first look-up table to store, for each of the subclasses, the typical response thereof; and a second look-up table to store, for each of the typical responses, the fixed set of parameters for the equaliser.

Advantageously, each typical response is stored in the first look-up table as a set of column vectors.

Preferably, the channel magnitude response is used as the classification means to divide channels into respective subclasses.

In our study of subscriber line channels (whose characteristics are given in ANSI T1.413-1995 standard), we have observed an interesting property of these channels which can be exploited in the equaliser design. Following the Falconer and Magee solution (see above), we have found that the desired responses that are obtained for different lengths of the line show very little variation with the line length. We have noted that these responses could be put under a few subclasses. Further, we have noted that one would lose very little if he chooses a nominal response as the desired (shortened) response for all the channels belonging to a subclass and design the equaliser accordingly. By doing so, we bypass the more involved steps of Falconer and Magee formulation, i.e., the first and second steps of the three steps noted above. The resulting equaliser would be suboptimal, however numerical results show that the difference between these suboptimal solutions and their optimum counterparts is very negligible. For most of the cases these remain within a range of a small fraction of one decibel.

In adopting the proposed method, the length of the line cannot be assumed to be known a priori. We thus need a mechanism for identifying which subclass the present channel belongs to. For this, we propose a signature analysis scheme which is very simple and practical. It involves computation of the inner products of a few vectors followed by some comparisons.

Based on the results that we obtained for ADSL channels of various length, we claim that this invention proposes an effective design method that works very well, particularly as compared to other existing suboptimal solutions. It achieves a close to optimum performance without resorting to the hard to implement eigen-solution of Falconer and Magee. The method is also very practical and thus should be considered as a very good compromise solution in an actual ADSL modem. Further, what is proposed in this invention is applicable to any class of channels whose responses could be categorised under a number of subclasses for the purpose of equalisation with the goal of impulse response shortening.

In this invention, we have developed a practical method for designing equalisers in the applications where the combined impulse responses of channel and equaliser need to be shortened to some duration smaller than the channel impulse response. The invention has in particular been found to be appropriate in the application of ADSL channels. In this application we have found that the subscriber lines of different lengths may be categorised under a few different subclasses (groups). The target response for each subclass can then be chosen to be fixed, with very negligible loss in performance.

A signature analysis technique is suggested which identifies the subclass corresponding the present channel through its impulse response, which is assumed to be measured using some identification scheme.

Once the channel impulse response and the desired target response of the equalised channel are known, computation of the equaliser coefficients (which is realised in transversal form) will be straightforward. For this we propose two different approaches: The first approach begins with constructing the corresponding Wiener-Hopf equation by using measured parameters of the channel, e.g. the channel impulse response and the autocorrelation coefficients of the background noise. The second approach is based on a frequency domain solution. The choice between these two approaches depends on the platform on which the transmission system is realised. The frequency domain approach results in a solution which is less accurate than that which would be obtained from the Wiener-Hopf equation, if numerical errors are assumed absent. However, solution provided by Wiener-Hopf equation, in general, is more susceptible to roundoff noise.

BRIEF DESCRIPTION OF THE DRAWINGS

In order that the present invention may be more readily understood, embodiments thereof will now be described, with reference to the accompanying drawings, in which.

DESCRIPTION OF THE INVENTION

Figure 1:
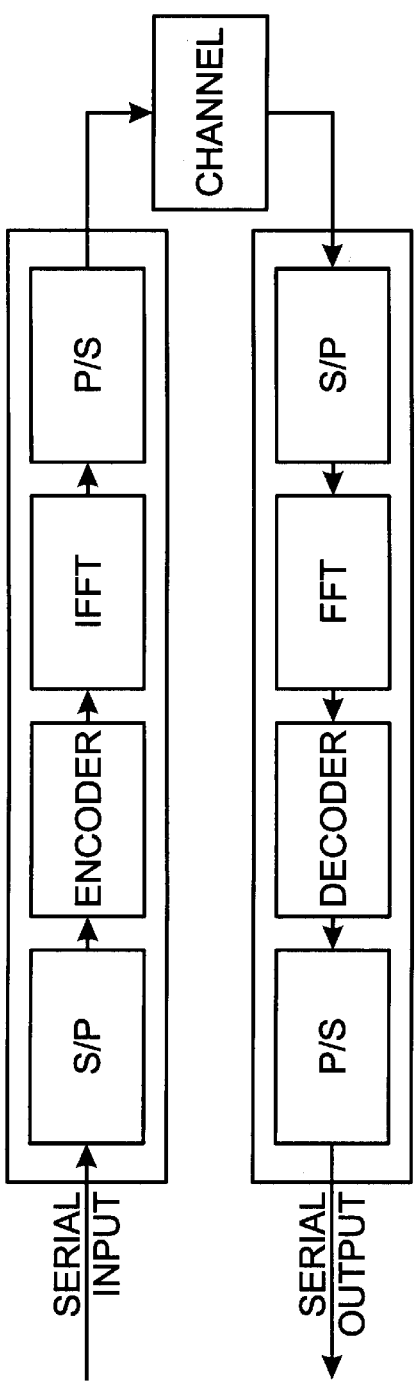
FIG. 1 shows a basic diagram of a multicarrier data transmission system.
Figure 2:
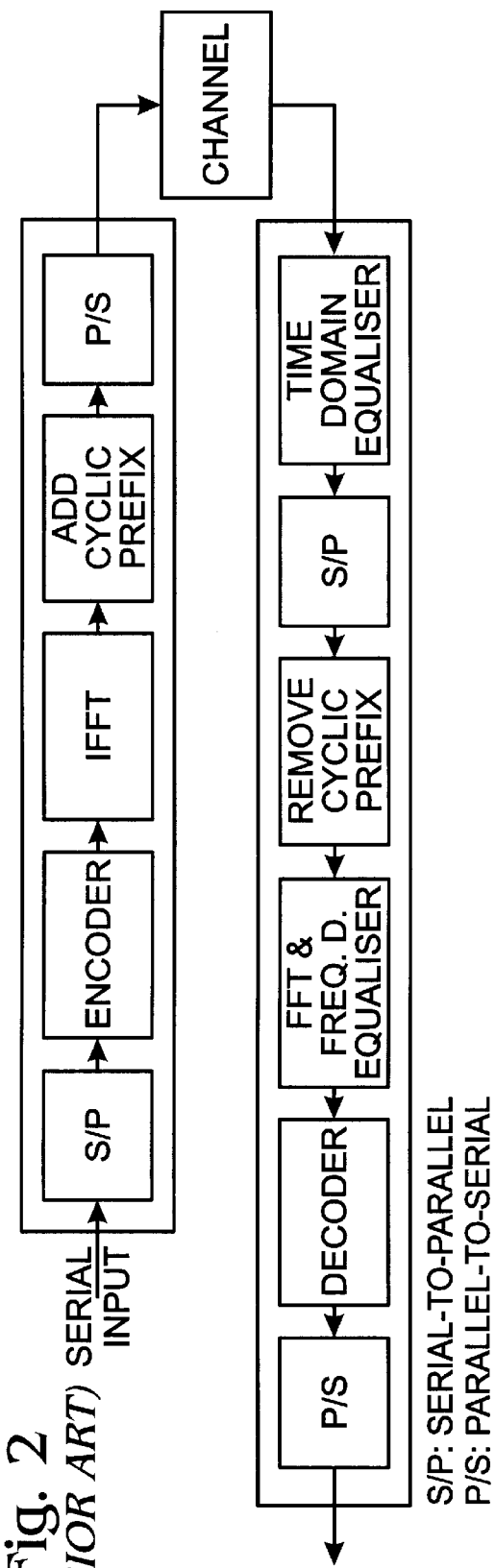
FIG. 2 depicts the block diagram of a DMT multicarrier data transmission system with cyclic prefix and time and frequency domain equalisers.
Figure 3:
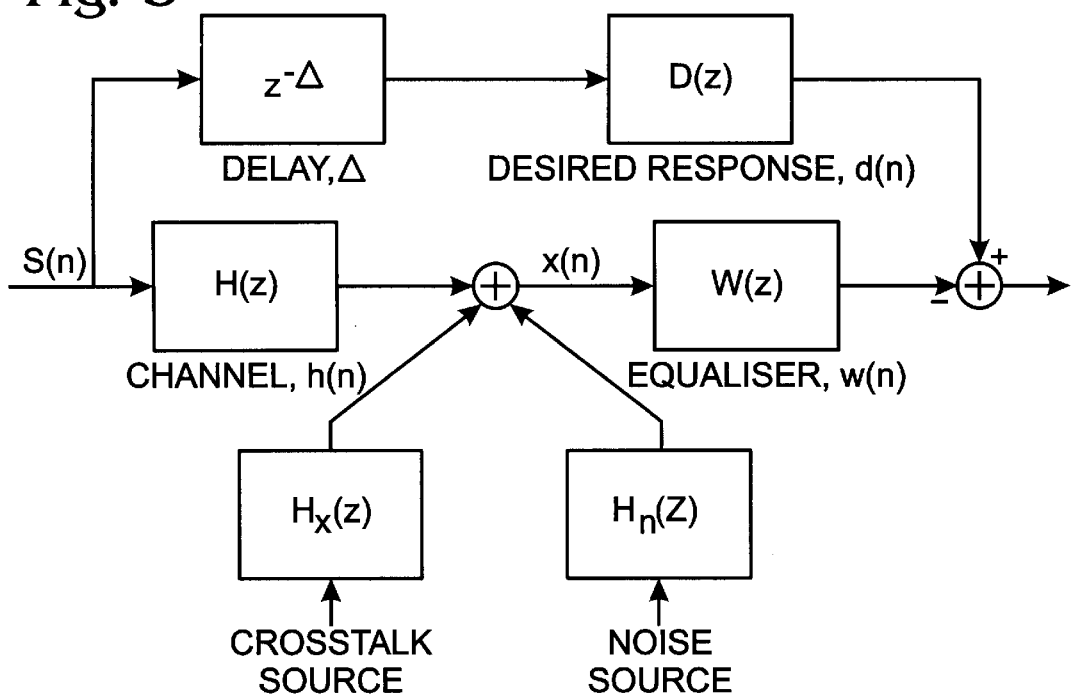
FIG. 3 depicts a block diagram graphically illustrating a problem addressed by embodiments of the invention.

FIG. 3 depicts a block diagram which puts the problem that we wish to solve in a structured form. The signal samples s(n) are passed through a communication channel with sampled impulse response h(n), of duration M sample intervals. Crosstalks and other undesirable noise signals are also added to the channel output. An N-tap time-domain transversal equaliser is used at the receiver to limit the overall duration of the impulse response of signal path, from input, s(n), to the equaliser output, y(n), to a duration of L samples, while a compromise is struck between the residual ISI and noise/crosstalk enhancement.

To formulate the problem of equaliser design in the above context and come up with a design formulation, the sequence d(n) and the delay A have also been introduced in FIG. 3. Here, d(n) plays the role of the desired equalised response, thus, it has a limited duration of L samples or less. The delay A is necessary to take care of the causality of the equaliser, w(n). The effect of channel noise and crosstalks from neighbouring channels are included in FIG. 3 by introducing related sources and colouring filters $H_n(z)$ and $H_x(z)$, respectively. These are assumed to be known or could be estimated by some means that is not discussed here, as it varies with applications. The unknown in the block diagram of FIG. 3 are thus the delay $\Delta$, desired response, d(n), and equaliser coefficients, w(n). These should be jointly optimised, based on some chosen criterion. The common criterion which results in a mathematically tractable solution is the mean-square error (MSE) at the equaliser output. The delay $\Delta$, desired response, d(n), and equaliser coefficients, w(n), are jointly optimised so that the MSE is minimised. When the delay, $\Delta$, and desired response, d(n), are known, the optimum values of the equaliser coefficients are obtained by solving the corresponding Wiener-Hopf equation. This solution is straightforward and can be carried out using Levinson-Durbin algorithm or other algorithms, for computational saving (see Simon Haykin, *Adaptive Filter Theory*, Prentice-Hall, 3rd Ed., 1996, and B. Farhang-Boroujeny, "Channel equalisation via channel identification: algorithms and simulation results for rapidly fading HF channels," IEEE Trans. Commun., November 1996, pp. 1409–1412, for example). However, as was noted earlier, simultaneous optimisation of $\Delta$, d(n) and w(n), is not that straightforward, as this leads to an eigenproblem and also the solutions should be obtained for a range of values of $\Delta$, to examine all possible cases in the optimisation process. This definitely is computationally intensive.

In this invention, we make the following assumption. We assume that the class of channels of interest (i.e., the channels over which the communications are established) can be divided into a number of subclasses so that for each subclass a fixed set of parameters $\Delta$ and d(n) could be used with very little degradation in SNR at the equaliser output. With this, we bypass the difficulty of computing the optimum values of $\Delta$ and d(n). They will be simply obtained by reading their values from a pre-stored look-up table.

We thus propose the following steps for equaliser design in the context that was just discussed:

Step 1: Estimation of the channel impulse response;

Step 2: identification of the subclass of the estimated channel; and

Step 3: computation of the equaliser coefficients.

Figure 4:
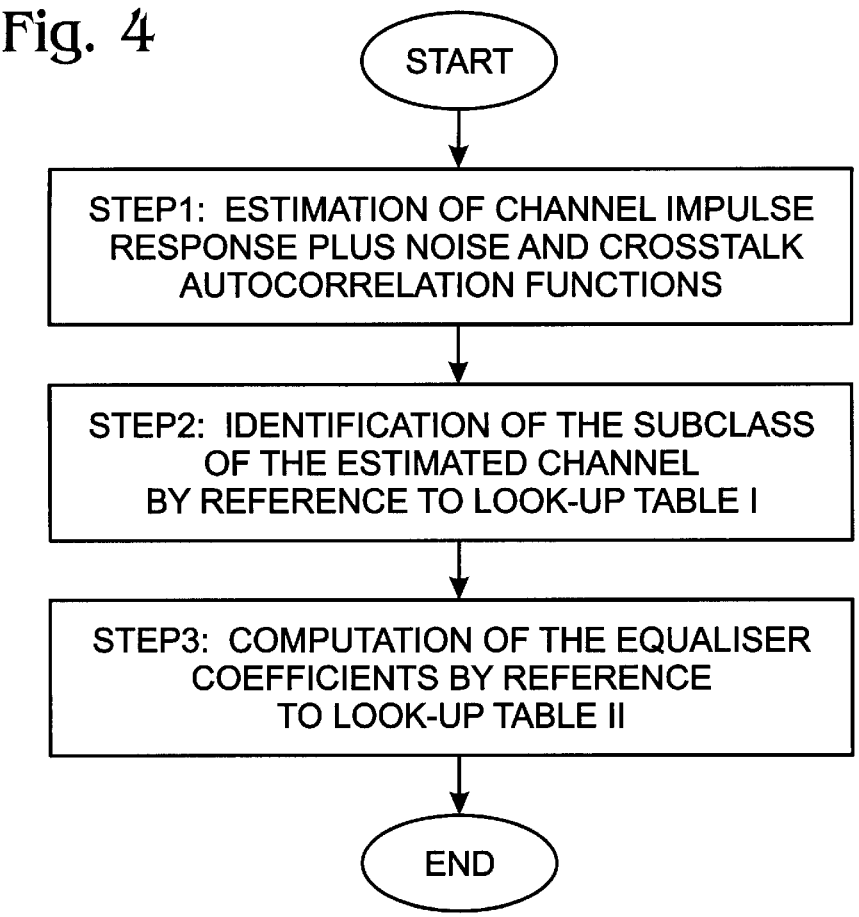
FIG. 4 presents the main steps of an equaliser design procedure embodying the invention.

These steps are also summarised in FIG. 4.

In most of the applications provision for estimation of channel response is provided in the related standards. For instance in the ANSI T1.413-1995 standard which has standardised DMT transmission over subscriber lines (known as ADSL), training sequences are required to be transmitted as part of the system initialisation for channel, noise and crosstalk estimation.

Once an estimate of the channel impulse response is obtained, a procedure should be executed to find which subclass the estimated channel belongs to. The method that we proposed for classification of the channels in subclasses is in order. We note that the parameters which most influence the choice of the unknowns $\Delta$, d(n) and w(n) are the autocorrelation coefficients of the channel output. On the other hand, such autocorrelations depend on the power spectral density of the underlying signals which, in the present case, is the channel output. Moreover, for a white data signal at the channel input, the power spectral density of the channel output is given by the square of its magnitude response, i.e. $|H(e^{j\omega})|^2$. Noting this, we propose the following procedure for dividing a class of channels in a number of subclasses:

1. Magnitude responses of a large set of the members of the channels of interest are obtained, through measurements and/or simulations, whichever appropriate.
2. The channels with close magnitude responses are grouped together to make subclasses.
3. A member of each subclass with a magnitude response close to the mean of all members of the subclass is chosen as typical (average) response for that subclass. This will be later used for identification of the subclass of the measured channel in the second step of the design procedure, as explained later. We assume that there are P subclasses and represent their typical responses by the set of column vectors $A_1, A_2, \ldots, A_P$. The elements of each of these vectors are squared samples of the average response of the associated subclass. The vectors $A_1, A_2, \ldots, A_P$ are stored in a look-up table. For convenience of reference, we call this Look-up Table I.
4. For each of the average responses, the optimum values of $\Delta$ and d(n) are obtained and stored in a look-up table. For convenience of reference, we call this Look-up Table II.

The above procedure is executed off-line and its results in Look-up Tables I and II are later loaded and used in an on-line manner by the related transmission system (modem).

Next, we explain how the results of the Look-up Tables I and II are used in a transmission system setup. As was noted earlier, Step 2 in the equaliser design requires identification of the subclass of the estimated channel. For this, we propose the following signature analysis method:

(i) Column vector A containing the squared values of samples of the magnitude response of the estimated channel is generated first;

(ii) the following quantities are then computed:

$$\gamma_i = A_i^T A_i - \frac{(A_i^T A)^2}{A^T A}, \text{ for } i = 1, 2, \ldots, P,$$

where the superscript T denotes vector transposition; and (iii) the index j which satisfies $$\gamma_j = \min(\gamma_1, \gamma_2, \ldots, \gamma_P)$$

is found and chosen as the subclass of the measured channel.

The above procedure is in fact nothing but finding the least-squares match of a scaled version of the measured vector, A, with the vectors $A_1, A_2, \ldots, A_P$ which are available in the Look-up Table I.

Once the subclass of the present (estimated) channel is found, the values of $\Delta$ and d(n) are directly obtained from the Look-up Table II. The execution of the last step of the equaliser design (i.e., Step 3 in FIG. 4) can then be carried out. As was noted earlier this step of the design can be carried out either by building and solving the corresponding Wiener-Hopf equation, or, alternatively, one may choose a frequency domain approach, as this result in a computationally less intensive scheme. The following formula may be used for this purpose:

$$W(k) = \frac{H^*(k)D(k)e^{-j2\pi\Delta k/K}}{|H(k)|^2 + N(k)}, \text{ for } k = 0, 1, \ldots, K-1 \quad (1)$$

where H(k) and D(k) are discrete Fourier transforms of h(n) and d(n), respectively, K is the length of DFT, N(k)'s are samples of power spectral density of the combined channel noise and crosstalks, and W(k) is the DFT of the equaliser response, w(n).

An Example: To demonstrate applicability of the invention, the proposed equaliser design procedure was applied to the ADSL channels whose details are given in Annex H of ANSI T1.413-1995. We noted that the designs provided by the proposed method remain very close of the optimum designs obtained by joint optimisation of $\Delta$, d(n) and w(n). The difference between the suboptimal designs obtained by using the method of this invention and the optimum solutions remains less than one decibel, with most of the cases having a difference of 0.1 to 0.2 dB or less. These results were obtained when we divided the class of ADSL channels with length in the range of 4 to 18 kfeet into 4 subclasses only.

REFERENCES

[1] E. A. Lee and D. G. Messerschmitt, *Digital Communication*. Kluwer Academic Publishers, 1994.
[2] J. G. Proakis, *Digital Communications*. McGraw-Hill, 3rd Ed., 1995.
[3] D. D. Falconer and F. R. Magee, Jr., "Adaptive channel memory truncation for maximum likelihood sequence estimation", Bell Syst. Tech. J., vol. 52, No. 9, pp. 1541–1562, November 1973.
[4] Jacky Chow and John M. Cioffi, "Method for equalising a multicarrier signal in a multicanier communication system", U.S. Pat. No. 5,285,474, Feb. 8, 1994.
[5] M. Nafie and A. Gatherer, "Time-Domain Equaliser Training for ADSL", in Proc. of ICC'97, pp. 1085–1089.
[6] Simon Haykin, Adaptive Filter Theory, Prentice-Hall, 3rd Ed., 1996.
[7] Farhang-Boroujeny, "Channel equalisation via channel identification: algorithms and simulation results for rapidly fading HF channels," IEEE Trans. Commun., November 1996, pp. 1409–1412.

What is claimed is:

1. A method of designing an impulse response shortening equaliser for use in a channel of a transmission system having an impulse response, the equaliser having a target response suited to a particular subclass of communication channel to shorten the duration of the impulse response of the overall transmission system, a class of channels being divided into a number of subclasses, each subclass having a fixed set of delay ($\Delta$) and desired response (d(n)) parameters selected to achieve the target response of the equaliser for that particular subclass of channel, the method comprising the steps of:

recognizing the subclass of the channel; and identifying the fixed set of parameters for the equaliser to achieve the target response by reference to a look-up table based on the subclass of the channel, the look-up table providing a delay and desired response parameter for each subclass of channel.

2. A method according to claim 1, comprising the further step of estimating the impulse response of the channel to identify to which subclass of channel the estimated channel belongs.

3. A method according to claim 1, wherein the method of recognizing the subclass comprises the step of carrying out a signature analysis of the channel impulse response.

4. A method according to claim 1, wherein the identified fixed set of parameters, when applied to the equaliser, cause very little degradation in the signal to noise ratio at an output of the equaliser.

5. A method according to claim 1, wherein the equaliser has equaliser coefficients, the optimum values of which are obtained by generating and solving a Wiener-Hopf equation using the fixed set of parameters for the equaliser obtained from the look up table.

6. A method according to claim 1, wherein the equaliser has equaliser coefficients, the optimum values of which are obtained by computation using a frequency domain approach.

7. A method according to claim 6, wherein the following formula comprises the frequency domain approach computation:

$$W(k) = \frac{H^*(k)D(k)e^{-j2\pi\Delta k/K}}{|H(k)|^2 + N(k)}, \text{ for } k = 0, 1, \ldots, K-1$$

where H(k) and D(k) are discrete Fourier transforms (DFT) of a sampled impulse response h(n) and a desired response d(n), respectively, K is the length of DFT, N(k)'s are samples of power spectral density of the combined channel noise and crosstalks, and W(w) is DFT of an equaliser response, w(n).

8. A method according to claim 1, wherein the look-up table comprises two look-up tables: a first look-up table to store, for each of the subclasses, the typical response thereof; and a second look-up table to store, for each of the typical responses, the fixed set of parameters for the equaliser.

9. A method according to claim 8, wherein each typical response is stored in the first look-up table as a set of column vectors.

10. A method according to claim 1, wherein a respective channel has a channel magnitude response, the method including the step of dividing the channels into respective subclasses in dependence on the channel magnitude response.

* * * * *